US011458556B2

(12) United States Patent
Wu (10) Patent No.: US 11,458,556 B2
(45) Date of Patent: Oct. 4, 2022

(54) HAND-HELD HEATING TOOL

(71) Applicant: Pro-Iroda Industries, Inc., Taichung (TW)

(72) Inventor: Wei Cheng Wu, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 804 days.

(21) Appl. No.: 16/420,292

(22) Filed: May 23, 2019

(65) Prior Publication Data

US 2020/0009672 A1 Jan. 9, 2020

(30) Foreign Application Priority Data

Jul. 9, 2018 (TW) .................................. 107123630

(51) Int. Cl.
  *B23K 3/00* (2006.01)
  *B23K 3/03* (2006.01)
  *B25F 5/02* (2006.01)
(52) U.S. Cl.
  CPC .......... *B23K 3/0346* (2013.01); *B23K 3/0361* (2013.01); *B25F 5/02* (2013.01)
(58) Field of Classification Search
  CPC ............... B23K 3/0346; B23K 3/0338; B23K 3/00–0392; B25F 5/02; B25G 1/10; B25G 3/38; B25B 11/00
  USPC .............................. 228/51–55; 219/277, 533
  See application file for complete search history.

(56) References Cited

U.S. PATENT DOCUMENTS

| | | | | |
|---|---|---|---|---|
| 2,542,038 A | * | 2/1951 | Lewis | B25F 5/02 403/96 |
| 3,248,034 A | * | 4/1966 | McNutt | B23K 3/03 228/55 |
| 4,779,786 A | * | 10/1988 | Holdway | B23K 1/018 228/55 |
| 6,364,033 B1 | * | 4/2002 | Hung | B25F 5/021 173/217 |
| 2006/0096770 A1 | * | 5/2006 | Roberts | B25F 5/02 173/217 |
| 2007/0084616 A1 | * | 4/2007 | Lam | B25F 5/02 173/217 |
| 2007/0144752 A1 | * | 6/2007 | Pozgay | B25F 5/02 173/216 |

(Continued)

FOREIGN PATENT DOCUMENTS

| | | | | |
|---|---|---|---|---|
| CN | 101200015 A | | 6/2008 | |
| DE | 10318563 A1 | * | 3/2004 | ............. B25B 21/00 |

(Continued)

*Primary Examiner* — Kiley S Stoner
(74) *Attorney, Agent, or Firm* — Alan D. Kamrath; Karin L. Williams; Mayer & Williams PC (57) ABSTRACT

A hand-held heating tool includes a handle unit, a pivot unit, a positioning unit, and a heating unit. The handle unit has a recess and a positioning portion. The pivot unit is pivotally connected to the handle unit and has a guiding groove and an abutment section. The positioning unit includes a positioning member, a control member, and an elastic member arranged between the control member and the abutment section. The control member is movably arranged in the guiding groove to actuate the positioning member to move relative to the recess so that the positioning member is selectively engaged with the positioning portion for adjusting a relative angle between the handle unit and the heating unit.

10 Claims, 7 Drawing Sheets

(56) References Cited

U.S. PATENT DOCUMENTS

| | | | |
|---|---|---|---|
| 2011/0030986 A1* | 2/2011 | Nagasaka | B25F 5/02 |
| | | | 173/171 |
| 2012/0037387 A1* | 2/2012 | Wei | B25D 11/068 |
| | | | 173/46 |
| 2018/0111213 A1 | 4/2018 | Mantes et al. | |
| 2019/0009398 A1* | 1/2019 | Zhong | B25B 21/00 |

FOREIGN PATENT DOCUMENTS

| | | | |
|---|---|---|---|
| GB | 556609 A | * | 10/1943 |
| JP | 2000-176636 A | | 6/2000 |
| TW | M444894 U | | 1/2013 |

* cited by examiner

HAND-HELD HEATING TOOL

BACKGROUND

The present invention relates to heating implements and in particular hand-held heating tools.

A typical soldering iron is composed of a heated metal tip and an insulated handle. Heating is often achieved electrically, by passing an electric current through a resistive heating element. However, the relative angle between the tip and the handle cannot be adjusted, so that the user cannot achieve an optimal welding angle during operation.

Thus, a need exists for a novel heating tool to mitigate and/or obviate the above disadvantages.

SUMMARY

A hand-held heating tool according to the present invention includes a handle unit, a pivot unit, a positioning unit, and a heating unit. The handle unit has a first pivotal portion provided with a recess and a positioning portion disposed on an inner periphery of the recess. The pivot unit has a second pivotal portion pivotally connected to the first pivotal portion. The second pivotal portion is provided with a guiding groove and an abutment section disposed in the guiding groove. The positioning unit includes a positioning member, a control member connected to the positioning member, and an elastic member elastically mounted between the control member and the abutment section. The positioning member is movably arranged in the recess and is detachably engaged with the positioning portion. The control member is movably arranged in the guiding groove to actuate the positioning member to move relative to the recess so that the positioning member is selectively engaged with the positioning portion. The heating unit is mounted on one end of the pivot unit opposite to the handle unit.

In an example, the first pivotal portion is provided with a plurality of positioning grooves disposed on the positioning portion. The positioning member has two engaging portions extended along a radial direction thereof. The two engaging portions are respectively disposed at two opposite side of the positioning member and are detachably engaged with two of the plurality of positioning grooves.

In an example, the plurality of positioning grooves are arranged along a circumferential direction of the positioning portion. Each two adjacent positioning grooves of the plurality of positioning grooves are angularly separated by 45 degrees.

In an example, the elastic member is a compression spring.

In an example, the control member has a fixed slot faced to the abutment section. Two opposite ends of the elastic member abut against the fixed slot and the abutment section.

In an example, the second pivotal portion has a plurality of first connecting holes penetrating through the abutment section. The positioning member has a plurality of second connecting holes penetrating through the positioning member. The control member has a plurality of connecting portions surrounding the fixed slot and extended toward the abutment section. The plurality of connecting portions are movably inserted to the plurality of first connecting holes. The positioning unit includes a plurality of fasteners inserted to the plurality of second connecting holes and fastened to the plurality of connecting portions.

In an example, the second pivotal portion has a guiding section extended from the abutment section and surrounded by the plurality of first connecting holes. The guiding section is parallel to the plurality of connecting portions. The positioning member has a guiding hole surrounded by the plurality of second connecting holes, and the guiding hole is movably mounted around the guiding section.

In an example, the pivot unit includes a first pivotal member and a second pivotal member mounted to the first pivotal member. The second pivotal portion is arranged at corresponding ends of the first and second pivotal members. The guiding groove, the abutment section, the plurality of first connecting holes, and the guiding section are disposed at the first pivotal member. The second pivotal portion has an assembling section disposed at the second pivotal member, and a fix member inserted to the assembling section. The fix member is fixed to the guiding section.

In an example, the handle unit includes a first handle member and a second handle member mounted to the first handle member. The first pivotal portion is arranged at corresponding ends of the first and second handle members. The positioning portion and the plurality of positioning grooves are disposed at the first handle member.

In an example, the hand-held heating tool further comprises an elastic deformable support unit having a first leg and a second leg. An end of the first handle member opposite to the first pivotal portion is provided with a first pivotal hole extended along a first axis. An end of the second handle member opposite to the first pivotal portion is provided with a second pivotal hole extended along a second axis parallel to the first axis. The first and second legs are respectively pivotally mounted to the first and second pivotal holes.

The present invention will become clearer in light of the following detailed description of illustrative embodiments of this invention described in connection with the drawings.

BRIEF DESCRIPTION OF THE DRAWINGS

The aforementioned and other aspects of the invention may best be understood by reference to the following description taken in conjunction with the accompanying drawings in which.

DETAILED DESCRIPTION

FIGS. 1-7 show a hand-held heating tool according to the present invention. The hand-held heating tool includes a handle unit 10, a pivot unit 20 pivotally connected to the handle unit 10, a positioning unit 30 mounted between the handle unit 10 and the pivot unit 20, a heating unit 40 disposed at one end of the pivot unite 20, and an support unit 50 disposed at one end of the handle unit 10. The positioning unit 30 can be operated between a locking position and a release position. When the positioning unit 30 is in the locking position, the pivot unit 20 cannot pivot relative to the handle unit 10 so that a relative angle between the handle unit 10 and the pivot unit 20 is fixed. When the positioning unit 30 is in the release position, the pivot unit 20 can pivot relative to the handle unit 10 so that the relative angle between the handle unit 10 and the pivot unit 20 is adjustable.

Figure 5:
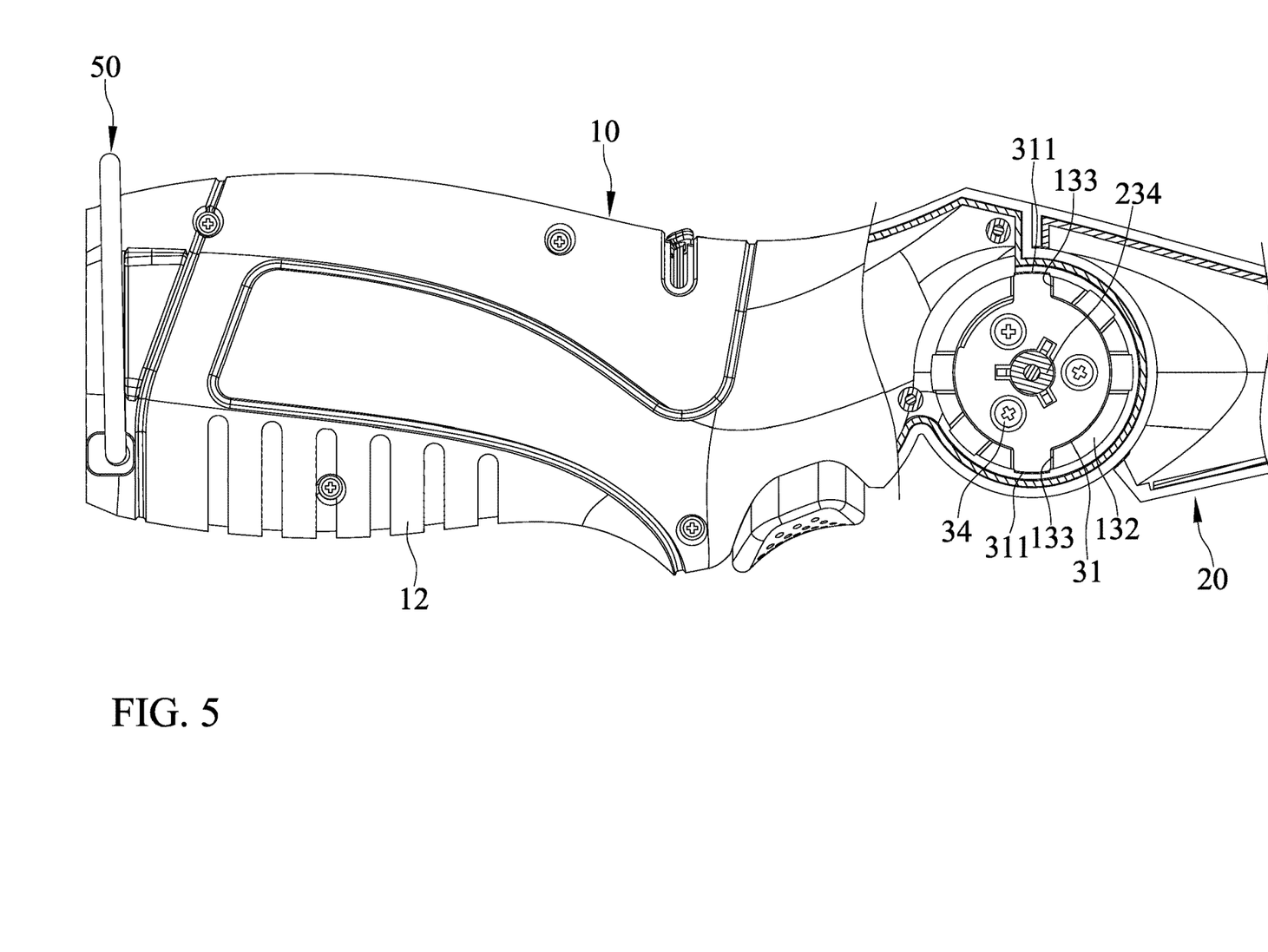

The handle unit 10 includes a first handle member 11, a second handle member 12 mounted to the first handle member 11, and a first pivotal portion 13 arranged at corresponding ends of the first and second handle members 11 and 12. One end of the first handle member 11 opposite to the first pivotal portion 13 is provided with a first pivotal hole 111 extended along a first axis A111. One end of the second handle member 12 opposite to the first pivotal portion 13 is provided with a second pivotal hole 121 extended along a second axis A121 parallel to the first axis A111. The first pivotal portion 13 is provided with a recess 131, a positioning portion 132 disposed on an inner periphery of the recess 131, and a plurality of positioning grooves 133 formed on the positioning portion 132. In the embodiment, the positioning portion 132 and the plurality of positioning grooves 133 may be disposed at the first handle member 11. The plurality of positioning grooves 133 are arranged along a circumferential direction of the positioning portion 132, and each two adjacent positioning grooves 133 are angularly separated by 45 degrees. The embodiment in FIG. 5 shows six positioning grooves 133 can be disposed at 0, 45, 90, 180, 225, and 270 degrees in the circumferential direction of the positioning portion 132, respectively.

The pivot unit 20 includes a first pivotal member 21, a second pivotal member 22 mounted to the first pivotal member 21, and a second pivotal portion 23 arranged at corresponding ends of the first and second pivotal members 21 and 22. The second pivotal portion 23 is pivotally connected to the first pivotal portion 13 and is provided with a guiding groove 231, an abutment section 232 disposed in the guiding groove 231, a plurality of first connecting holes 233 penetrating through the abutment section 232, and a guiding section 234 extended from the abutment section 232 and surrounded by the plurality of first connecting holes 233. In the embodiment, the guiding groove 231, the abutment section 232, the plurality of first connecting holes 233, and the guiding section 234 may be disposed at the first pivotal member 21. The second pivotal portion 23 further has an assembling section 235 disposed at the second pivotal member 22, and a fix member 236 inserted to the assembling section 235, and the fix member 236 is fixed to the guiding section 234. The fix member 236 may be a screw, and the guiding section 234 may be a threaded hole corresponding to the screw.

The positioning unit 30 includes a positioning member 31, a control member 32 connected to the positioning member 31, and an elastic member 33 elastically mounted between the control member 32 and the abutment section 232. The positioning member 31 is movably arranged in the recess 131 and is detachably engaged with the positioning portion 132. The control member 32 is movably arranged in the guiding groove 231 to actuate the positioning member 31 to move relative to the recess 131 so that the positioning member 31 is selectively engaged with the positioning portion 132 to cause the positioning unit 30 switched between the locking position and the release position.

The positioning member 31 has two engaging portions 311 extended along a radial direction thereof, a plurality of second connecting holes 312 penetrating through the positioning member 31, and a guiding hole 313 surrounded by the plurality of second connecting holes 312. The two engaging portions 311 are respectively disposed at two opposite side of the positioning member 31 and are detachably engaged with opposite two of the plurality of positioning grooves 133. The guiding hole 313 is movably mounted around the guiding section 234 to cause the positioning member 31 is movable relative to the recess 131 along the guiding section 234 so that the two engaging portions 311 are selectively engaged with opposite two of the plurality of positioning grooves 133.

The control member 32 has a fixed slot 321 faced to the abutment section 232, and a plurality of connecting portions 322 surrounding the fixed slot 321 and extended toward the abutment section 232. The plurality of connecting portions 322 are movably inserted to the plurality of first connecting holes 233, and the guiding section 234 is parallel to the plurality of connecting portions 322.

The positioning unit 30 further includes a plurality of fasteners 34 inserted to the plurality of second connecting holes 312 and fastened to the plurality of connecting portions 322 to cause the positioning member 31 moved relative to the recess 131 when the control member 32 is moved relative to the guiding groove 231. The plurality of fasteners 34 may be a screws, and the plurality of connecting portions 322 may be threaded holes corresponding to the screw. The elastic member 33 may be a compression spring, and two opposite ends of the elastic member 33 abut against the fixed slot 321 and the abutment section 232.

The heating unit 40 is mounted on one end of the pivot unit 20 opposite to the handle unit 10, especially is mounted at corresponding ends of the first and second pivotal members 21 and 22. The hearting unit 40 may be a soldering tip.

The support unit 50 may be made of metal to be elastic deformable and has a first leg 51 and a second leg 52 to substantially form a U-shape. The first and second legs 51 and 52 are respectively pivotally mounted to the first and second pivotal holes 111 and 121. Thus, the support unit 50 can be pivoted relative to the handle unit 10 and is positioned relative to the first and second pivotal holes 111 and 121 by the elastic restoring force of the metal, thereby preventing the handle unit 10 from falling down when standing upright.

Figure 1:
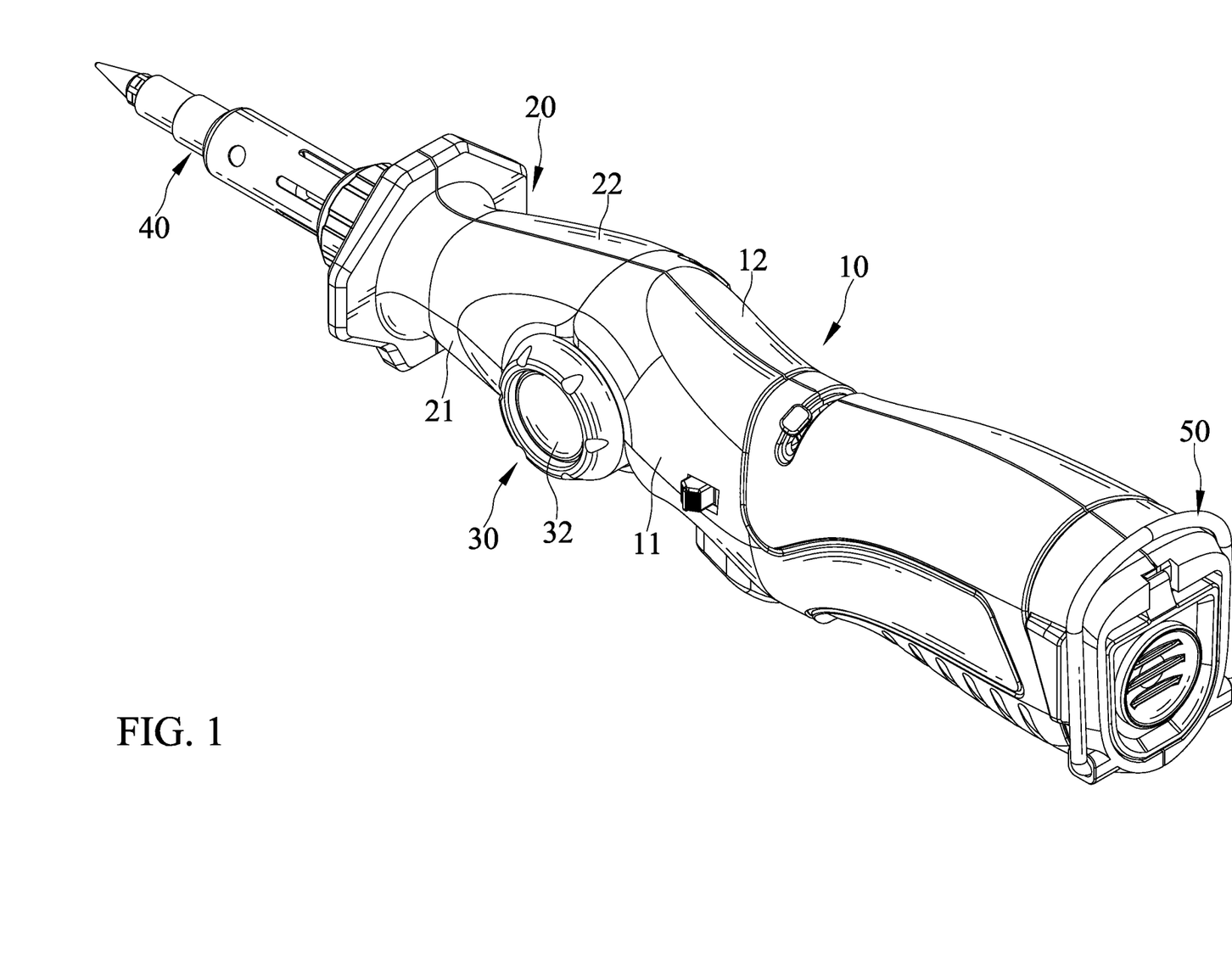
FIG. 1 is a perspective view of a hand-held heating tool according to the present invention.
Figure 2:
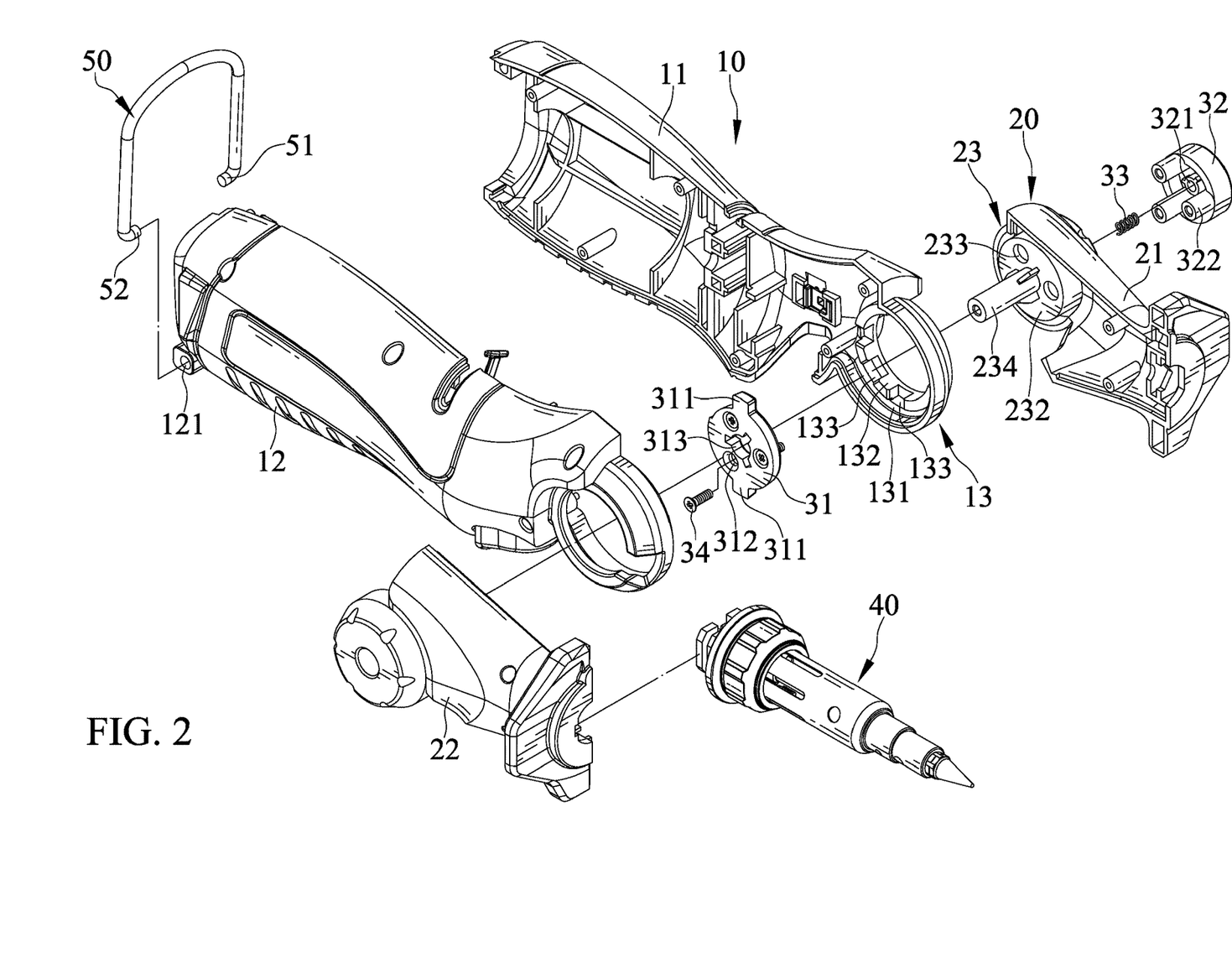
FIG. 2 is an exploded, perspective view of the hand-held heating tool of FIG. 1.
Figure 3:
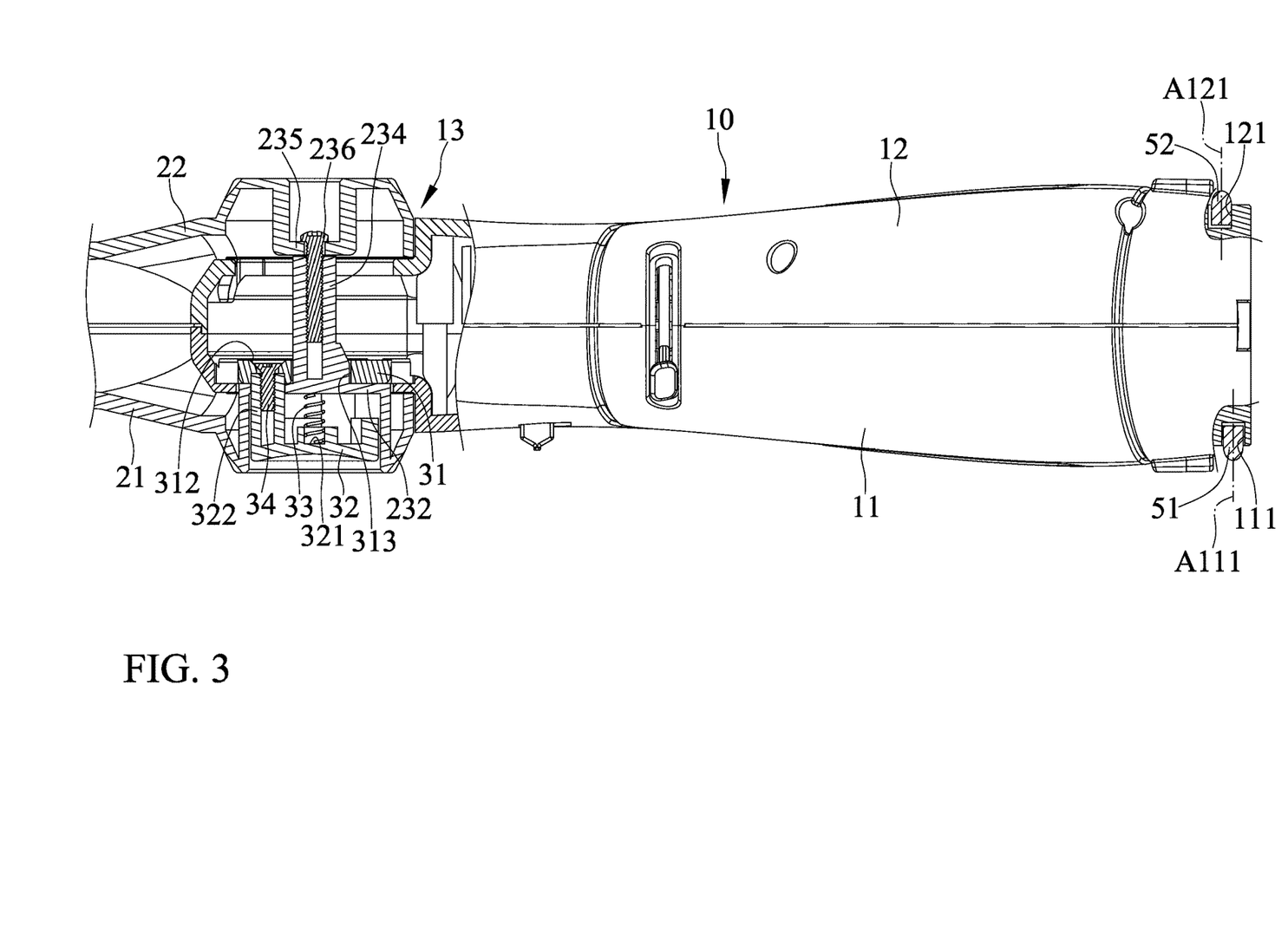
FIGS. 3-5 are exploded, partial cross-sectional views of the hand-held heating tool of FIG. 1.
Figure 4:
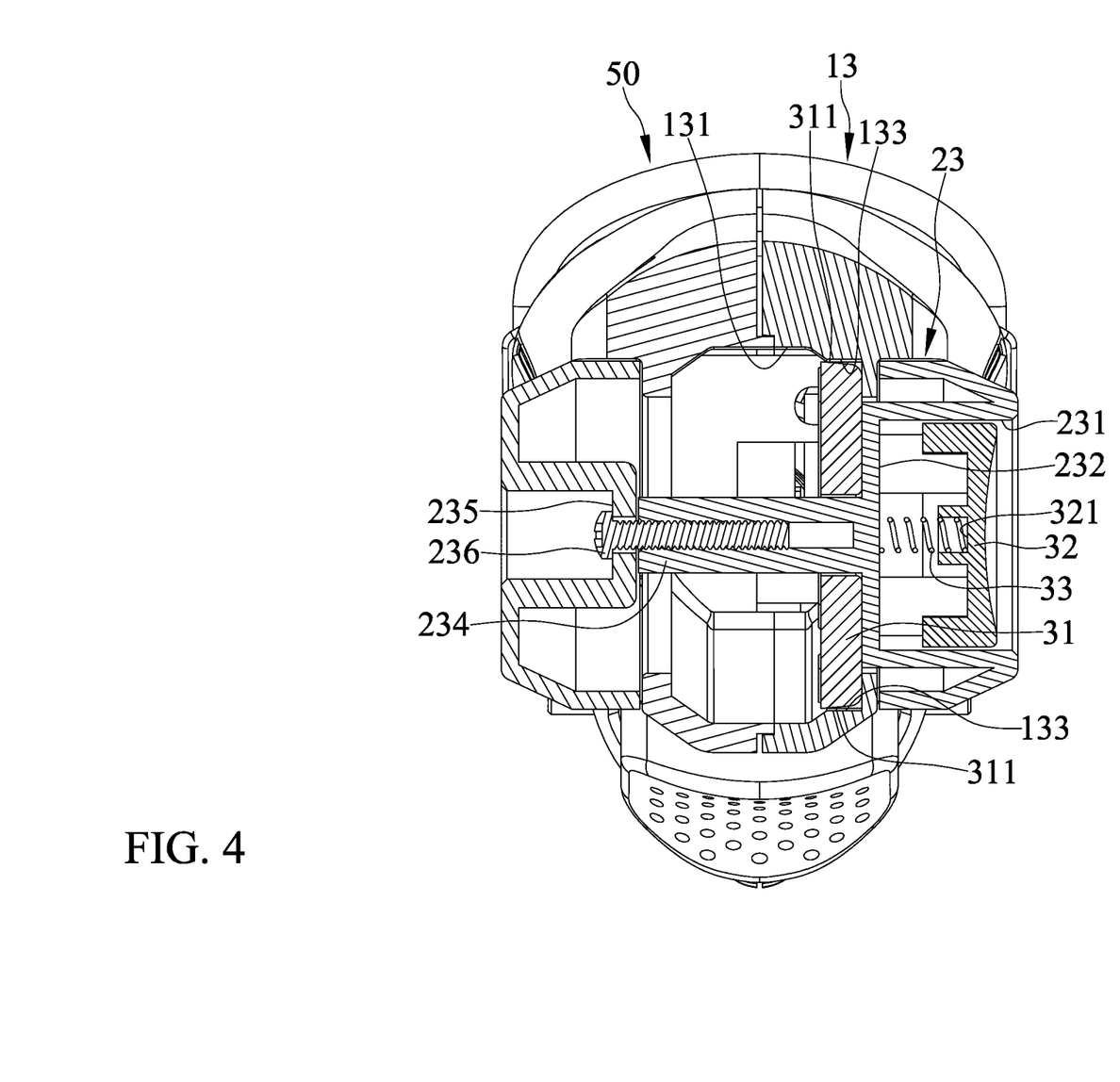

FIGS. 4 and 5 show the positioning unit 30 in the locking position. The handle unit 10 and the pivot unit 20 are separated by 180 degrees, and the two engaging portions 311 of the positioning member 31 are engaged with the opposite two positioning grooves 133 disposed at 90 degrees and 270 degrees in the circumferential direction of the positioning portion 132. Thus, the relative angle between the handle unit 10 and the pivot unit 20 is fixed to 180 degrees and cannot be adjusted.

Figure 6:
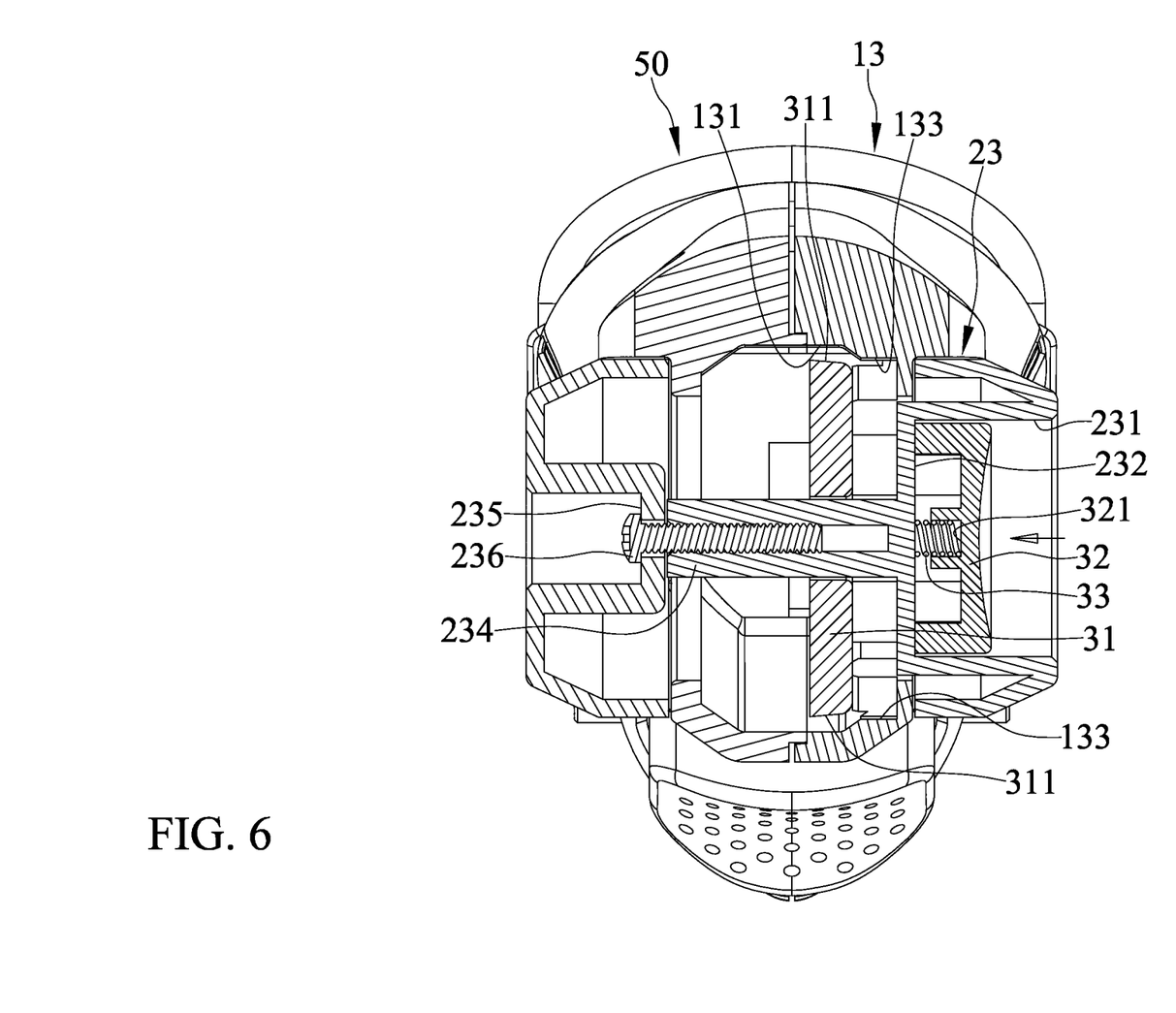
FIG. 6 is a continued view of FIG. 4 and shows a control member being pushed to cause a positioning member disengaged from a positioning portion.

FIG. 6 shows the positioning unit 30 switched from the locking position to the release position. The user can press the control member 32 to cause the control member 32 to move relative to the guiding groove 231 to actuate the positioning member 31 to move relative to the recess 131 so that the two engaging portions 311 of the positioning member 31 are disengaged from opposite two of the plurality of positioning grooves 133. The elastic member 33 is compressed between the fixed slot 321 and the abutment section 232.

Figure 7:
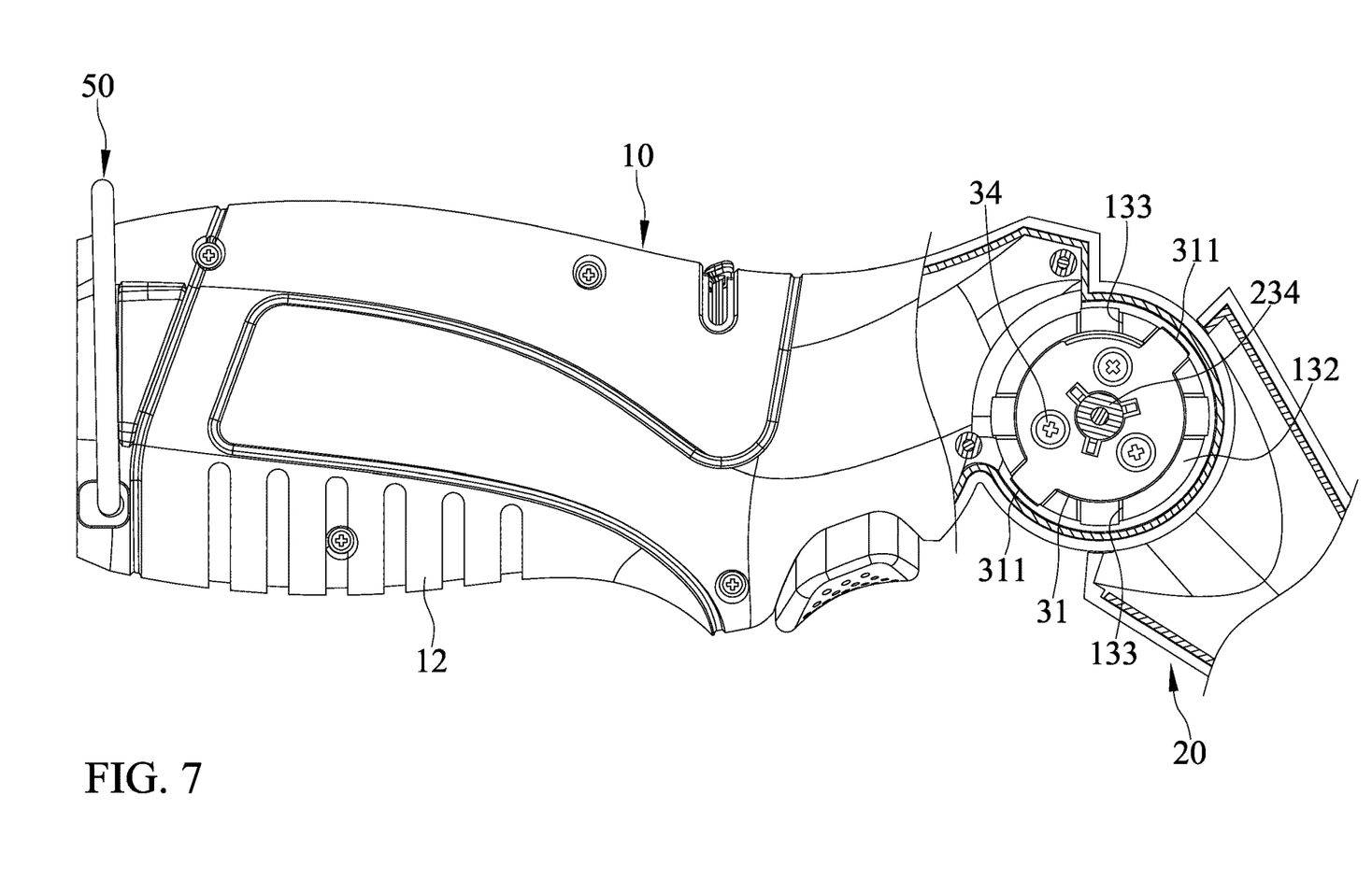
FIG. 7 is a continued view of FIG. 5 and shows a pivot unit pivoting relative to a handle unit.

FIG. 7 shows the positioning unit 30 in the release position. The pivot unit 20 can be pivoted relative to the handle unit 10 to adjust the relative angle between the handle unit 10 and the pivot unit 20. As shown in FIG. 7, the handle unit 10 and the pivot unit 20 are separated by 135 degrees. After the relative angle between the handle unit 10 and the pivot unit 20 is adjusted, the user can stop pressing the control member 32, and the elastic member 33 push the control member 32 to move relative to the guiding groove 231 under the elastic restoring force to cause the two engaging portions 311 of the positioning member 31 engaged with the opposite two positioning grooves 133 disposed at 45 degrees and 225 degrees in the circumferential direction of the positioning portion 132 so that the relative angle between the handle unit 10 and the pivot unit 20 is fixed to 135 degrees and cannot be adjusted.

While various embodiments have been described above, it should be understood that they have been presented by way of example only, and not limitation. For example, any of the elements associated with the privacy summary may employ any of the desired functionality set forth hereinabove. Thus, the breadth and scope of a preferred embodiment should not be limited by any of the above-described exemplary embodiments.

What is claimed is:

1. A hand-held heating tool comprising:
a handle unit having a first pivotal portion provided with a recess and a positioning portion disposed on an inner periphery of the recess;
a pivot unit having a second pivotal portion pivotally connected to the first pivotal portion, and with the second pivotal portion provided with a guiding groove and an abutment section disposed in the guiding groove;
a positioning unit including a positioning member, a control member connected to the positioning member, and an elastic member elastically mounted between the control member and the abutment section, with the positioning member movably arranged in the recess and detachably engaged with the positioning portion, and with the control member movably arranged in the guiding groove to actuate the positioning member to move relative to the recess so that the positioning member is selectively engaged with the positioning portion; and
a heating unit mounted on one end of the pivot unit opposite to the handle unit.

2. The hand-held heating tool as claimed in claim 1, wherein the first pivotal portion is provided with a plurality of positioning grooves disposed on the positioning portion, wherein the positioning member has two engaging portions extended along a radial direction thereof, and wherein the two engaging portions are respectively disposed at two opposite side of the positioning member and are detachably engaged with two of the plurality of positioning grooves.

3. The hand-held heating tool as claimed in claim 1, wherein the plurality of positioning grooves are arranged along a circumferential direction of the positioning portion, and wherein each two adjacent positioning grooves of the plurality of positioning grooves are angularly separated by 45 degrees.

4. The hand-held heating tool as claimed in claim 1, wherein the elastic member is a compression spring.

5. The hand-held heating tool as claimed in claim 1, wherein the control member has a fixed slot faced to the abutment section, and wherein two opposite ends of the elastic member abut against the fixed slot and the abutment section.

6. The hand-held heating tool as claimed in claim 5, wherein the second pivotal portion has a plurality of first connecting holes penetrating through the abutment section, wherein the positioning member has a plurality of second connecting holes penetrating through the positioning member, wherein the control member has a plurality of connecting portions surrounding the fixed slot and extended toward the abutment section, wherein the plurality of connecting portions are movably inserted to the plurality of first connecting holes, and wherein the positioning unit includes a plurality of fasteners inserted to the plurality of second connecting holes and fastened to the plurality of connecting portions.

7. The hand-held heating tool as claimed in claim 6, wherein the second pivotal portion has a guiding section extended from the abutment section and surrounded by the plurality of first connecting holes, wherein the guiding section is parallel to the plurality of connecting portions, wherein the positioning member has a guiding hole surrounded by the plurality of second connecting holes, and wherein the guiding hole is movably mounted around the guiding section.

8. The hand-held heating tool as claimed in claim 7, wherein the pivot unit includes a first pivotal member and a second pivotal member mounted to the first pivotal member, wherein the second pivotal portion is arranged at corresponding ends of the first and second pivotal members, wherein the guiding groove, the abutment section, the plurality of first connecting holes, and the guiding section are disposed at the first pivotal member, wherein the second pivotal portion has an assembling section disposed at the second pivotal member, and a fix member inserted to the assembling section, and wherein the fix member is fixed to the guiding section.

9. The hand-held heating tool as claimed in claim 2, wherein the handle unit includes a first handle member and a second handle member mounted to the first handle member, wherein the first pivotal portion is arranged at corresponding ends of the first and second handle members, and wherein the positioning portion and the plurality of positioning grooves are disposed at the first handle member.

10. The hand-held heating tool as claimed in claim 9, further comprising:
an elastic deformable support unit having a first leg and a second leg, wherein one end of the first handle member opposite to the first pivotal portion is provided with a first pivotal hole extended along a first axis, wherein one end of the second handle member opposite to the first pivotal portion is provided with a second pivotal hole extended along a second axis parallel to the first axis, and wherein the first and second legs are respectively pivotally mounted to the first and second pivotal holes.

* * * * *